United States Patent Office 3,073,152
Patented Jan. 15, 1963

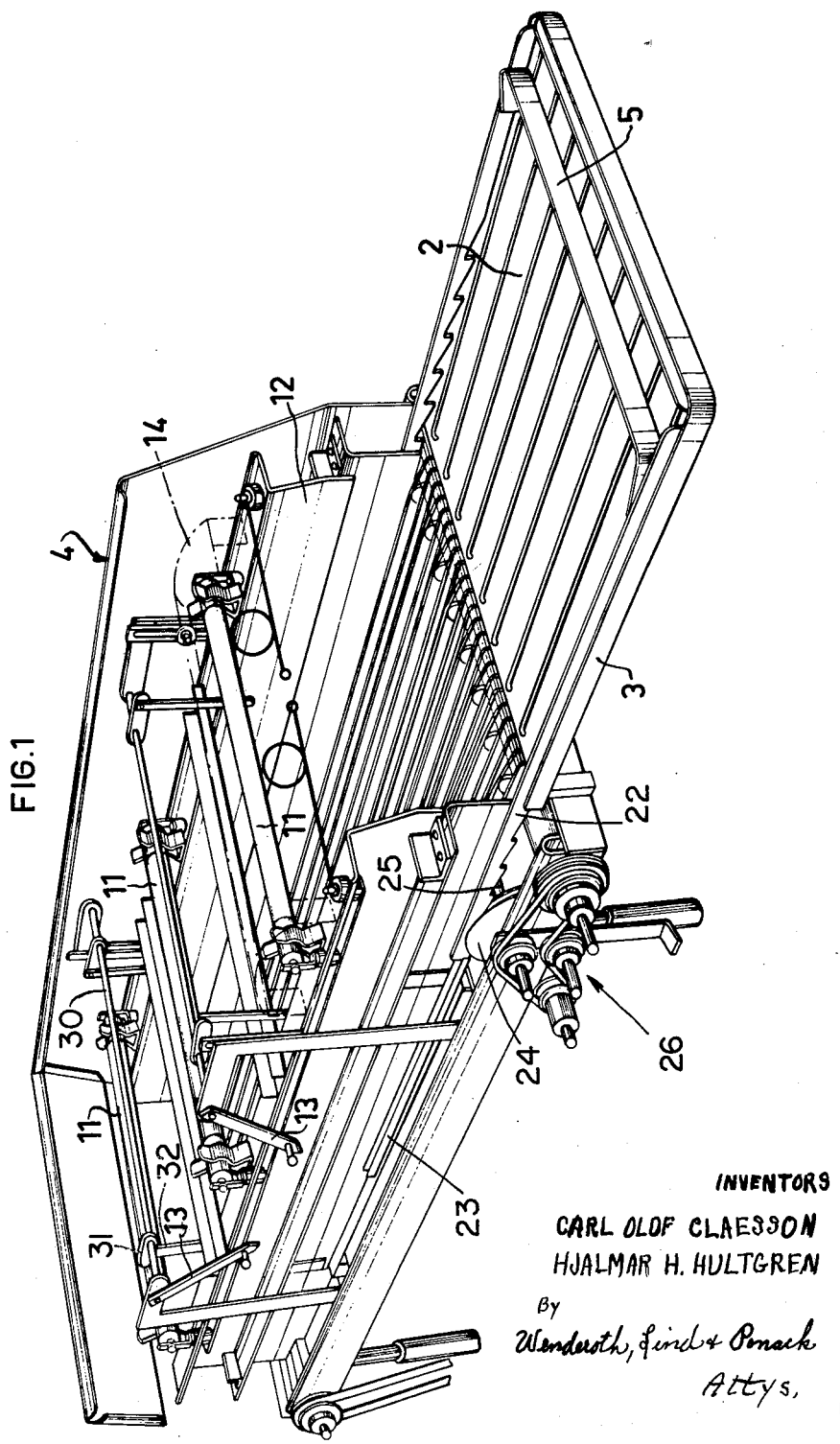

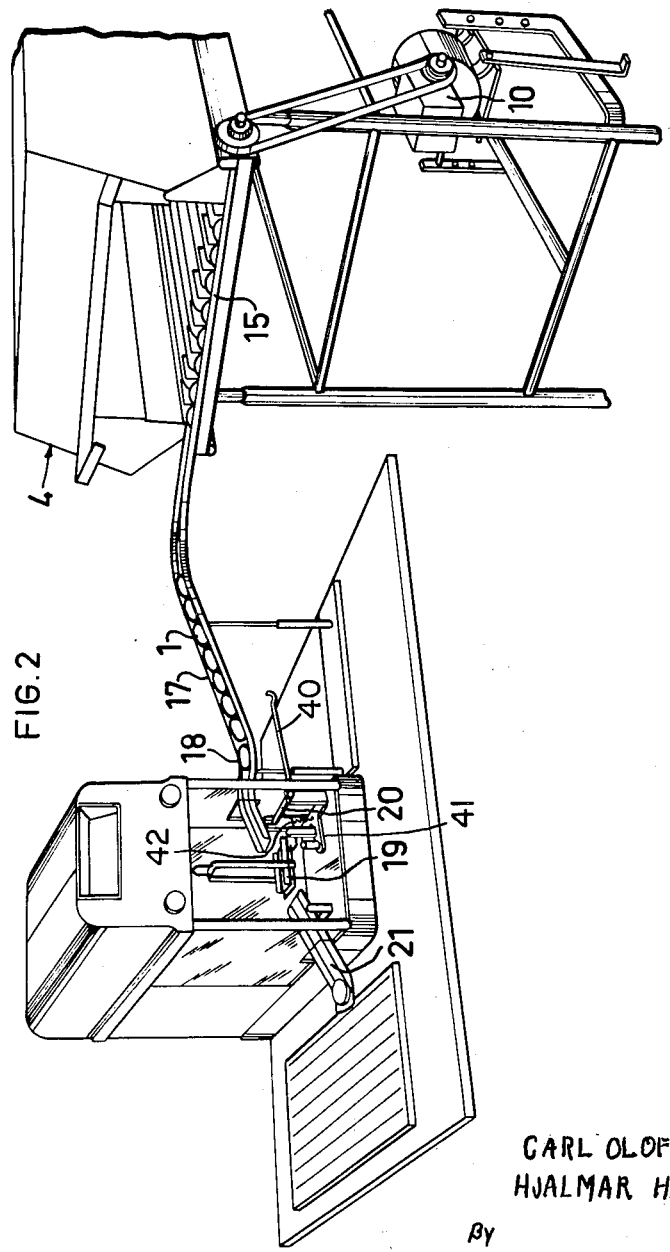

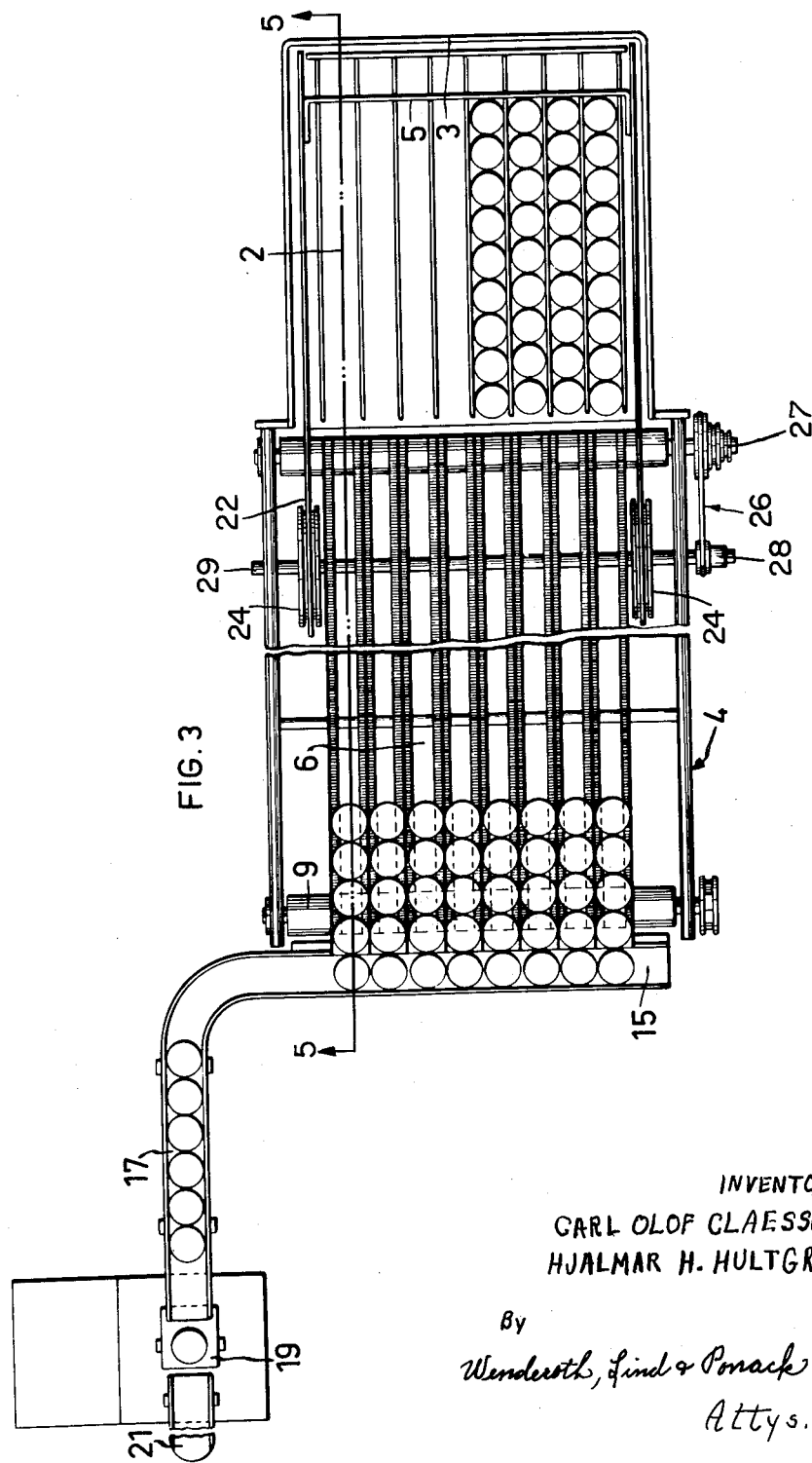

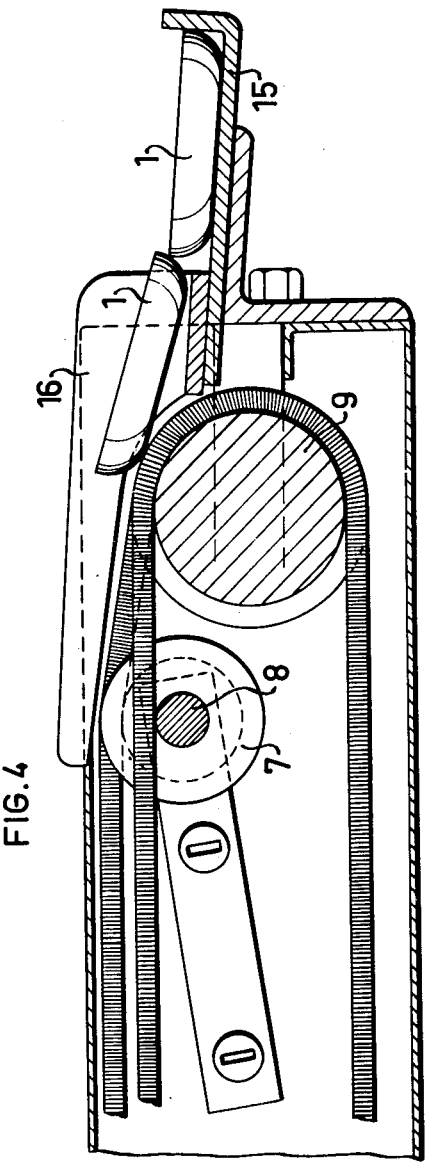

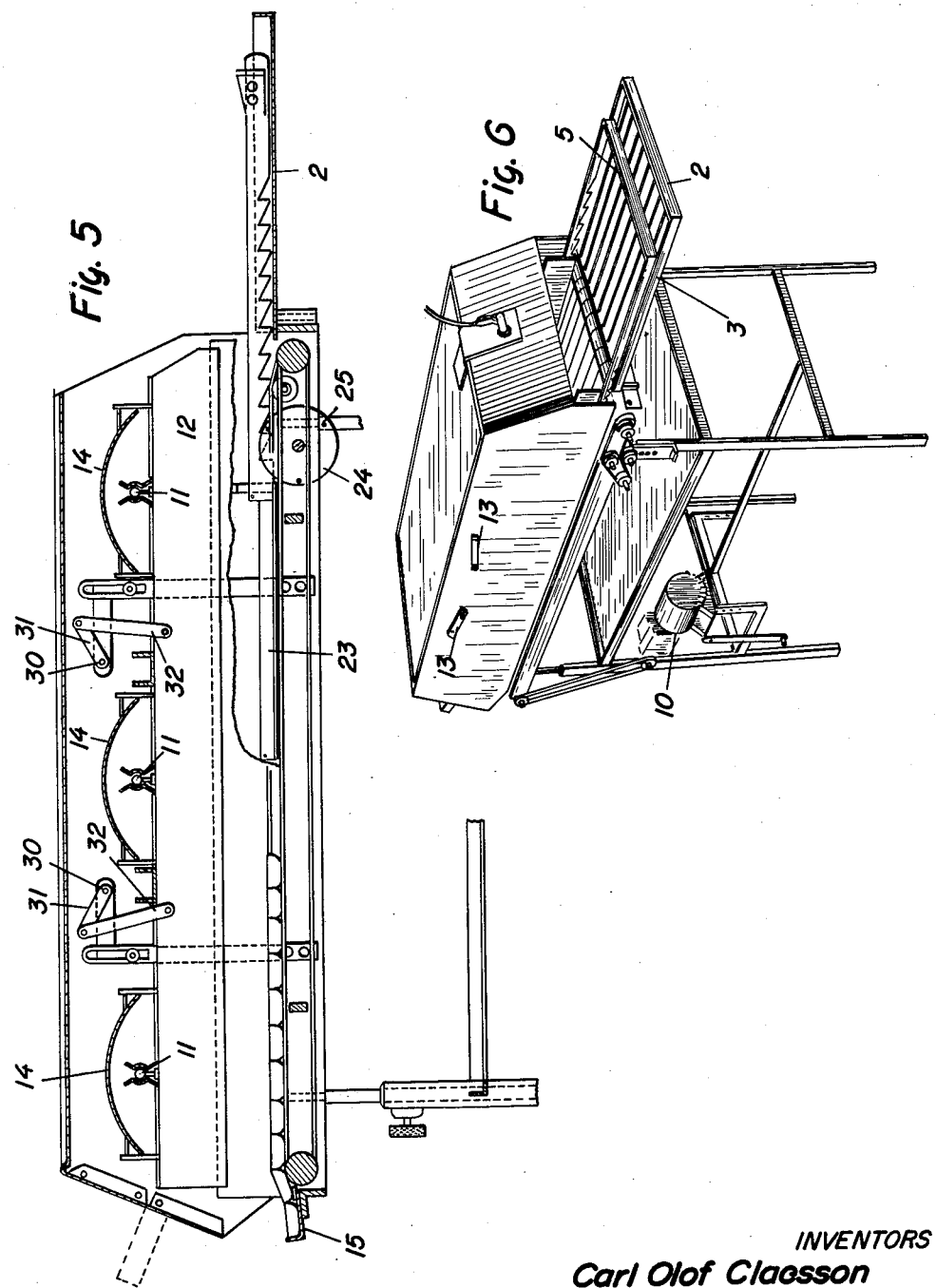

3,073,152
MACHINES FOR DETERMINING THE DRY
SUBSTANCE IN VARIOUS MATERIALS
Carl Olof Claesson, Wiad, Eldtomta, Sweden (Slavasta, Uppsala, Sweden), and Hjalmar Hilding Hultgren, Asvagen 9, Uttran, Sweden
Filed May 12, 1959, Ser. No. 812,749
Claims priority, application Sweden May 17, 1958
13 Claims. (Cl. 73—61)

This invention relates to a machine for the gravimetric determination of the dry substance in various materials, e.g. milk. According to the invention the machine comprises a platform or station for receiving a large number of vessels containing the material, the dry substance of which is to be determined, the receiving station being of such a width that several vessels can be placed side by side in said station, an apparatus arranged after the receiving station for drying the material in said vessels, an apparatus arranged after the drying apparatus for individually weighing the vessels, and a continuous conveyor track for conveying the vessels from the receiving station and passing them through the drying apparatus and the weighing apparatus. The invention makes it possible quickly to effect a great number of dry substance determinations.

Further features of the invention and the advantages gained thereby will become apparent from the following description, reference being had to the accompanying drawings illustrating an embodiment of the machine by way of example, which is especially intended for the determination of the dry substance in milk samples.

In the drawings:

FIG. 1 is a perspective view of the machine as seen from the supply end, a number of details having been broken away for greater clarity.

FIG. 2 is a perspective view of the machine as seen from the delivery end.

FIG. 3 is a diagrammatic plan view of the machine.

FIG. 4 is a longitudinal section of the discharge end of the drying apparatus.

FIG. 5 is a cross-sectional view taken upon section line 5—5 of FIGURE 3, and

FIGURE 6 is a perspective view of the apparatus complete without the weighing apparatus.

In the drawings the cup-shaped shallow vessels containing the milk, the dry substance of which is to be determined, are designated 1. The vessels 1 are made from punched aluminium foil and provided with cotton filters to distribute the milk and to facilitate drying thereof by increasing the surface and preventing the formation of crusts.

The machine according to the invention comprises a platform or like station 3 for receiving a large number of vessels 1, an apparatus 4 for drying the material in the vessels 1, an apparatus for weighing said vessels, and a continuous conveyor track for conveying the vessels from the receiving station 3 through the drying apparatus 4 and the weighing apparatus.

The vessels are arranged in rows on a table 2 in the receiving station 3, which has longitudinally extending guide ribs for preventing lateral displacement of the vessels 1. The receiving station 3 has a stepwise or continuously operating driver 5 which feeds the vessels 1 from the table 2 to the drying apparatus 4.

The part of the conveyor track passing through the drying apparatus 4 consists of a conveyor belt 6. In a preferred embodiment the conveyor belt 6 is constituted by a number of spaced, endless, tightly wound coil springs, which makes for a good ventilation in the drying apparatus. The drying apparatus preferably is a drying chamber having a roof of perforated metal sheets.

Each row of vessels 1 is supported by two coil springs. The vessels are guided laterally in that the extreme coil springs and every third intermediate coil spring are raised by supporting wheels 7 which are mounted on a shaft 8. Alternatively, the raising of the guide coil springs can be provided in that the portions of the end cylinders 9, about which said coil springs run, have larger radii than those portions of said cylinders, about which the supporting coil springs run. As will appear from the drawing the coil spring conveyor belt 6 is driven over a V-rope transmission by a worm-gear electric motor 10.

The conveyor belt 6 terminates at a horizontal channel 15 which is at right angles to the belt.

The part of the conveyor track leading from the drying apparatus 4 to and away from the weighing apparatus is constituted by an inclined chute 17, 21 which is interrupted at one point to accommodate the scale pan 19 of the weighing apparatus. The scale pan 19 is surrounded by windows having passages for the chute portions 17, 21.

The inclined chute 17, 21, whose width is substantially equal to that of the vessels 1, extends from the drying apparatus 4 in the transverse direction of the conveyor belt 6, thus constituting a prolongation of the horizontal channel 15 arranged at the end of the conveyor belt 6.

The heat in the drying chamber is generated by tubes 11 for infrared radiation. The radiation tubes 11 are mounted above the conveyor belt 6 transversely thereof and extend across the entire effective width thereof. The radiation tubes 11 cooperate with reflectors 14 which are so placed and shaped that the radiation will vary longitudinally of the conveyor belt 6. Thus the radiation is evenly distributed across the conveyor belt, for which reason all samples or vessels 1 will be exposed to the same amount of radiation at their travel through the drying apparatus 4. This type of radiation, which varies longitudinally of the conveyor belt, thus being strongest beneath the tubes and weaker therebetween, will facilitate the drying operation, since at the lower temperatures the remaining liquid will be distributed in the filter so that the subsequent higher-temperature radiation will have an improved effect.

The radiation tubes 11 are arranged in such a way that the horizontal channel 15 arranged at the end of the conveyor belt 6 is also exposed to radiation, with the result that the vessels 1 in said channel 15 are prevented from taking up water again.

As will appear from the drawings, the radiation tubes 11 are mounted on a frame 12 which can be raised and lowered relative to the conveyor belt 6 by link arms 13 which are operable from outside.

The inclined chute portion 17 is provided ahead of the weighing apparatus with stop means 18 for the vessels 1 conveyed in said chute portion. In the embodiment illustrated said stop means is constituted by a horizontal chute portion. In another embodiment the stop means 18 may consist of two barriers arranged ahead of the weighing apparatus at the inclined chute portion 17, said barriers being spaced apart a distance substantially equal to the width of the vessels 1. The barriers are adapted to be moved alternately into and out of blocking position so that one vessel 1 at a time is supplied to the weighing apparatus.

Consequently, the vessels 1 are adapted to be transferred one after the other from the stop means 18 to the scale pan 19 in order to be weighed. The scale pan 19 cooperates with means 20 for tilting said scale pan to provide continued transport of the weighed vessels 1 in the portion 21 of the inclined chute extending from said scale pan. The tilting movement is to be effected only after the movement of the scale pan has been stopped. Therefore, means for stopping the weighing apparatus may be adapted on one hand to initiate the means 20 for tilting the scale pan 19 and on the other simultaneously to stop the movement thereof. Said means may also be adapted to release the barrier type stop means 18 so that a new vessel 1 is supplied to the scale pan 19 when the movement of the latter has been stopped.

The driver 5 has two racks 22 with a number of teeth corresponding to the number of cups accommodated longitudinally of the table 2. According to the drawing there are ten teeth. The tooth pitch naturally is equal to the diameter of the cups.

The racks 22 are guided on one hand by the bottom of the platform 3 and on the other by U-shaped rails 23 provided in the interior of the machine. The racks 22 cooperate with drive wheels 24 which are provided with a peripheral recess for guiding said racks laterally. For advancing the racks 22 the drive wheels 24 are provided in the recesses with three pins 25 which are to engage with the rack teeth. The drive wheels 24 are driven by a belt transmission 26.

The return of the driver 5 to initial position takes place manually in connection with the raising thereof, the racks 22 being disengaged from the drive wheels 24 and their pins 25.

The belt transmission 26 includes a step cone 27 which is mounted on the extension of the feed roll shaft and which by means of a belt is adapted to drive the disk 28 on the shaft 29 on which the drive wheels 24 are disposed. The use of the highest step of the step cone 27 results in a continuous feed whereas the other steps of the step cone 27 produce a stepwise feed.

The radiation tubes 11 which are arranged at right angles to the direction of feed are spaced such distances apart and disposed in such a manner relative to the reflectors 14 that the heat radiation will be greatest directly beneath the tubes 11 and decrease up to a point, as seen in the direction of feed, midway between two tubes 11. The varying heating to which the cups are thus exposed gives an extremely favorable drying effect.

The radiation tubes 11 are arranged in an upper frame 12 which is vertically adjustable relative to a lower frame. Raising and lowering of the upper frame is effected by means of the link arms 13 which are fixedly arranged on a pivot 30 which is mounted in the frame. Fixedly secured to the pivot 30 is one end of a link 31 which has its other end pivoted to one end of a link 32 the other end of which is pivoted to the frame 12.

In FIG. 2 the means for tilting the scale pan 19 is a two-armed lever one outer arm 40 of which is for manual actuation, while the inner arm 41 is adapted to engage the scale pan 19 for tilting it. The two arms are laterally offset relative to each other at their common fulcrum. By the action of a spring 42 the lever is normally held swung out of the path of the scale pan 19.

After the travel through the drying apparatus 4 the first vessels 1 in each row are moved into the horizontal channel 15. The next vessels 1 are retained in their rows by the coil springs and the guide pins 16 provided in prolongation thereof. By this arrangement the vessels 1 in the horizontal channel 15 can be transferred to the inclined chute portion 17 without the next following vessels 1 being laterally displaced. The lateral movement of the vessels 1 to the inclined chute portion 17 can be effected either by hand or by means of a transverse feed means, e.g. a slide. When the first vessels 1 in each row have been moved aside in the manner described, the conveyor belt 6 automatically delivers the following ones. Should the delivered vessels 1 not have had time to move aside, the following vessels 1 slip in the row of said vessels on the supporting coil springs without any disadvantages arising therefrom.

The vessels 1 with the cotton filters therein shall first travel through the machine for determination of the weight which may be marked on punched cards. The vessels 1 are then again placed on the table 2 and supplied with a certain amount of the milk samples, which may be for instance 1 millilitre or 1 gram. The milk samples can advantageously be filled into the vessels 1 by means of a calibrated syringe. After the vessels 1 have passed the apparatus for drying and weighing the samples the second time, the dry substance content of the samples is calculated from the difference between the two weighing operations. The vessels 1 are discarded after use.

The speed of the conveyor belt 6 and the radiation in the drying apparatus 4 are of course balanced in such a way that a complete drying of the samples is obtained during their travel through said apparatus. The number of rows on the conveyor belt 6 as well as the length thereof and consequently the number of radiation tubes 11 may of course be selected in such a way that any desired capacity of the drying apparatus 4 is obtained.

While the invention has been described in the foregoing with reference to a preferred embodiment, it is understood that it is not limited to this very embodiment, as a plurality of modifications may be resorted to within the scope of the appendant claims.

We claim:

1. A machine for the gravimetric determination of the dry substance in various materials, comprising a station for receiving a plurality of vessels containing the material, the dry substance of which is to be determined, said receiving station having a width to accommodate a plurality of vessels placed side by side, a drying apparatus having an open bottom arranged after said receiving station for drying the material in said vessels, conveyor belts of wire coils for moving said vessels through said drying apparatus, a weighing apparatus arranged after said drying apparatus for weighing the individual vessels, a conveyor track for conveying the vessels from said drying apparatus in single line through said weighing apparatus, said receiving station comprising a table to which said vessels are supplied, and an operating driver to transfer said vessels from said table to said drying apparatus.

2. A machine as set forth in claim 1 wherein said conveyor belts comprise a plurality of spaced, endless, tightly wound coil springs.

3. A machine as set forth in claim 1 wherein said conveyor track comprises a horizontal channel at right angles to said conveyor belts at the termination thereof.

4. A machine as set forth in claim 1, wherein said drying apparatus comprises a drying chamber having radiation tubes.

5. A machine as set forth in claim 4 wherein said radiation tubes are mounted above said conveyor belts transversely thereof and extend across the entire effective width of said conveyor belts.

6. A machine as set forth in claim 5, wherein reflectors cooperate with said radiation tubes so that the radiation will vary longitudinally of said conveyor belts.

7. A machine as set forth in claim 1 wherein said conveyor track comprises an inclined chute having an interruption at one point to accommodate said weighing apparatus and said chute leads from said drying apparatus to and away from said weighing apparatus.

8. A machine as set forth in claim 7 wherein a scale pan is provided for the weighing apparatus which cooperates with means for tilting said scale pan to provide continued transport of the weighed vessels in the portion of the inclined chute extending from said scale pan.

9. A machine as set forth in claim 7 wherein said inclined chute is provided ahead of the weighing apparatus with stop means for the vessels conveyed therein.

10. A machine as set forth in claim 9 wherein said stop means consists of a horizontal chute portion.

11. A machine as set forth in claim 7 wherein a horizontal channel is arranged at the end of said conveyor belts and said inclined chute has a width substantially equal to that of each vessel and extends from said drying apparatus transversely of said conveyors as a prolongation of said channel.

12. A machine as set forth in claim 11 wherein said drying apparatus comprises radiation tubes and said horizontal channel at the end of the conveyor belts is exposed to radiation from said tubes.

13. A machine as set forth in claim 12 wherein means are provided to raise and lower said radiation tubes relative to said conveyor belts.

References Cited in the file of this patent

UNITED STATES PATENTS

| | | |
|---|---|---|
| 1,463,923 | Nelson | Aug. 7, 1923 |
| 2,009,259 | Hall et al. | July 23, 1935 |
| 2,575,220 | Hiller | Nov. 13, 1951 |
| 2,575,426 | Parnell | Nov. 20, 1951 |
| 2,621,774 | Rourke | Dec. 16, 1952 |
| 2,622,438 | Campbell | Dec. 23, 1952 |
| 2,664,557 | Sargrove | Dec. 29, 1953 |
| 2,709,914 | Brabender et al. | June 7, 1955 |

FOREIGN PATENTS

| | | |
|---|---|---|
| 987,207 | France | Apr. 11, 1951 |